（12) United States Patent
Kojima et al.

(10) Patent No.: US 9,479,666 B2
(45) Date of Patent: Oct. 25, 2016

(54) IMAGE READING APPARATUS, IMAGE FORMING APPARATUS, NON-TRANSITORY COMPUTER READABLE MEDIUM, AND METHOD

(71) Applicant: FUJI XEROX CO., LTD., Tokyo (JP)

(72) Inventors: Risa Kojima, Kanagawa (JP); Kosuke Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/620,337

(22) Filed: Feb. 12, 2015

(65) Prior Publication Data

US 2016/0044202 A1 Feb. 11, 2016

(30) Foreign Application Priority Data

Aug. 5, 2014 (JP) ................. 2014-159783

(51) Int. Cl.
*H04N 1/46* (2006.01)
*H04N 1/04* (2006.01)
*H04N 1/40* (2006.01)

(52) U.S. Cl.
CPC .................. *H04N 1/04* (2013.01); *H04N 1/40* (2013.01); *H04N 1/46* (2013.01)

(58) Field of Classification Search
CPC .................................. H04N 1/04; H04N 1/40
USPC ............... 358/505, 502, 515, 518, 496, 498; 382/162, 167
See application file for complete search history.

(56) References Cited

U.S. PATENT DOCUMENTS

| 5,696,610 A * | 12/1997 | Imoto ..................... H04N 1/488 348/276 |
| 6,046,829 A * | 4/2000 | Noda ................... H04N 3/1581 348/E3.027 |
| 2006/0056883 A1* | 3/2006 | Watanabe .......... G03G 15/0163 399/302 |
| 2007/0115339 A1* | 5/2007 | Matsuzaki ............... B41J 2/473 347/118 |
| 2007/0115517 A1* | 5/2007 | Sakai ....................... H04N 1/46 358/509 |
| 2011/0013241 A1* | 1/2011 | Ohara ................ H04N 1/00023 358/518 |

FOREIGN PATENT DOCUMENTS

JP 2003-250054 A 9/2003

\* cited by examiner

*Primary Examiner* — Cheukfan Lee
(74) *Attorney, Agent, or Firm* — Sughrue Mion, PLLC

(57) ABSTRACT

An image reading apparatus includes a reading unit that reads a plurality of colors in a document, a relative movement unit that causes the reading unit and the document to make a relative movement in a first scanning direction, and an output unit that outputs color information at an interval, the color information indicating whether the document read by the reading unit is chromatic, the interval being longer in the first scanning direction than a length in the first scanning direction of a color misregistration, the color misregistration being expected to occur in an image if a speed of the relative movement fluctuates owing to a unique performance characteristic of the relative movement unit, the image being obtained as a result of reading by the reading unit.

13 Claims, 12 Drawing Sheets

IMAGE READING APPARATUS, IMAGE FORMING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2014-159783 filed Aug. 5, 2014.

BACKGROUND

Technical Field

The present invention relates to an image reading apparatus, an image forming apparatus, a non-transitory computer readable medium, and a method.

SUMMARY

According to an aspect of the invention, there is provided an image reading apparatus including a reading unit that reads a plurality of colors in a document, a relative movement unit that causes the reading unit and the document to make a relative movement in a first scanning direction, and an output unit that outputs color information at an interval, the color information indicating whether the document read by the reading unit is chromatic, the interval being longer in the first scanning direction than a length in the first scanning direction of a color misregistration, the color misregistration being expected to occur in an image if a speed of the relative movement fluctuates owing to a unique performance characteristic of the relative movement unit, the image being obtained as a result of reading by the reading unit.

BRIEF DESCRIPTION OF THE DRAWINGS

Exemplary embodiment of the present invention will be described in detail based on the following figures, wherein.

DETAILED DESCRIPTION

Hereinafter, an exemplary embodiment of the invention will be described in detail with reference to the drawings.

Figure 1:
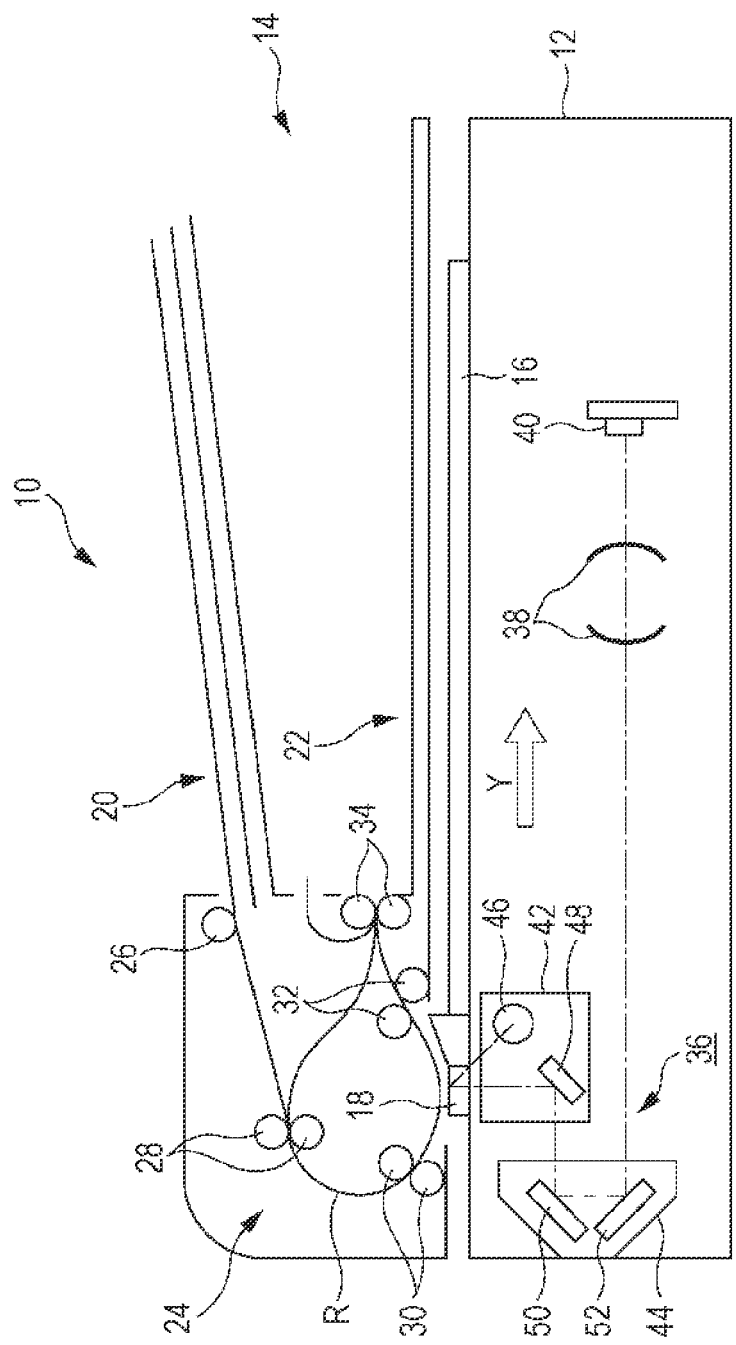
FIG. 1 is a schematic diagram illustrating an example of the configuration of the mechanical system of an image reading apparatus according to an exemplary embodiment.

For example, as illustrated in FIG. 1, an image reading apparatus 10 includes an apparatus body 12, and a document pressing part 14 that is supported on the apparatus body 12 so as to freely open and close via a hinge mechanism or the like. On the upper surface of the apparatus body 12, a first document glass 16 used in a first reading mode described later, and a second document glass 18 used in a second reading mode described later are arranged side by side. Each of the first document glass 16 and the second document glass 18 are made of glass (transparent glass or the like) that transmits light.

The document pressing part 14 is opened and closed by the user when pressing the document placed on the first document glass 16 from above. The document pressing part 14 has a document setting part 20, a document discharge part 22, and a document transport part 24. The document transport part 24 is an example of a relative movement unit and a transport unit according to the exemplary embodiment of the invention. The document setting part 20 is a part on which a document (document bundle) to be read in a second reading mode based on the CVT system is set. The document discharge part 22 is a part where the document read in the second reading mode is discharged. The document setting part 20 and the document discharge part 22 are disposed above and below each other in the document pressing part 14, respectively.

The document transport part 24 transports the document set on the document setting part 20 sheet by sheet along a transport path R. After moving the transported document on the second document glass 18, the document transport part 24 finally discharges the document toward the document discharge part 22.

The document transport part 24 has a feed roller 26, a first transport roller 28, a registration roller 30, a second transport roller 32, and a discharge roller 34. These rollers are provided in this order from the upstream side in the transport direction. The feed roller 26 feeds the document set on the document setting part 20 onto the transport path R. The first transport roller 28 transports the document fed by the feed roller 26 toward the registration roller 30 along the transport path R. The registration roller 30 sends the document transported by the first transport roller 28, onto the second document glass 18. After the document sent by the registration roller 30 moves on and passes the second document glass 18, the second transport roller 32 receives this document and transports the document toward the discharge roller 34. The discharge roller 34 receives the document transported by the second transport roller 32, and discharges the document to the document discharge part 22.

The document transport part 24 including the multiple rollers 26 to 34 mentioned above has a reversal function and an alignment function, in addition to the basic transport function of transporting the document by rotation of each roller and also moving the document on the second document glass 18 during this transport. The reversal function reverses the document from front to back for two-sided reading. The alignment function allows the orientation of the document surface reversed by this reversal function to return to the original orientation before being discharged to the document discharge part 22. Because the reversal function and the alignment function are not directly related to the scope of the exemplary embodiment of the invention, a detailed description of these functions is omitted herein.

Inside the apparatus body 12, an optical scanning system 36, an imaging lens 38, and a photoelectric conversion element 40 are provided as an example of a reading unit according to the exemplary embodiment of the invention. The optical scanning system 36 is implemented by using a full rate carriage 42 and a half rate carriage 44, which are each disposed so as to be movable in a first scanning direction Y (left-right direction in FIG. 1). The full rate carriage 42 is equipped with a lamp 46 and a first mirror 48. The half rate carriage 44 is equipped with a second mirror 50 and a third mirror 52.

Each of the full rate carriage 42 and the half rate carriage 44 is an example of a relative movement unit according to the exemplary embodiment of the invention. The full rate carriage 42 and the half rate carriage 44 move in the first scanning direction Y, with a carriage movement motor common to each of the carriages serving as a drive source. At this time, the half rate carriage 44 moves by half the amount of movement (movement speed) of the full rate carriage 42. Consequently, no matter to which position the carriages 42 and 44 move with respect to the first scanning direction Y, the length of the optical path from the document surface to the photoelectric conversion element 40 is kept constant at all times.

The lamp 46 irradiates the document surface to be read with light. Reflected light from the document surface is reflected by the first mirror 48, the second mirror 50, and the third mirror 52 in this order. The imaging lens 38 focuses the light reflected by the third mirror 52 to form an image on the imaging surface of the photoelectric conversion element 40 at a predetermined reduction ratio. The photoelectric conversion element 40, which is an image sensor for reading a document, includes a three-line color charge coupled device (CCD) sensor, for example. The photoelectric conversion element 40 performs photoelectric conversion on light reflected from the document surface on a pixel-by-pixel basis, and outputs an analog image signal in the red (R), green (G), and blue (B) format (analog RGB signal).

Figure 2:
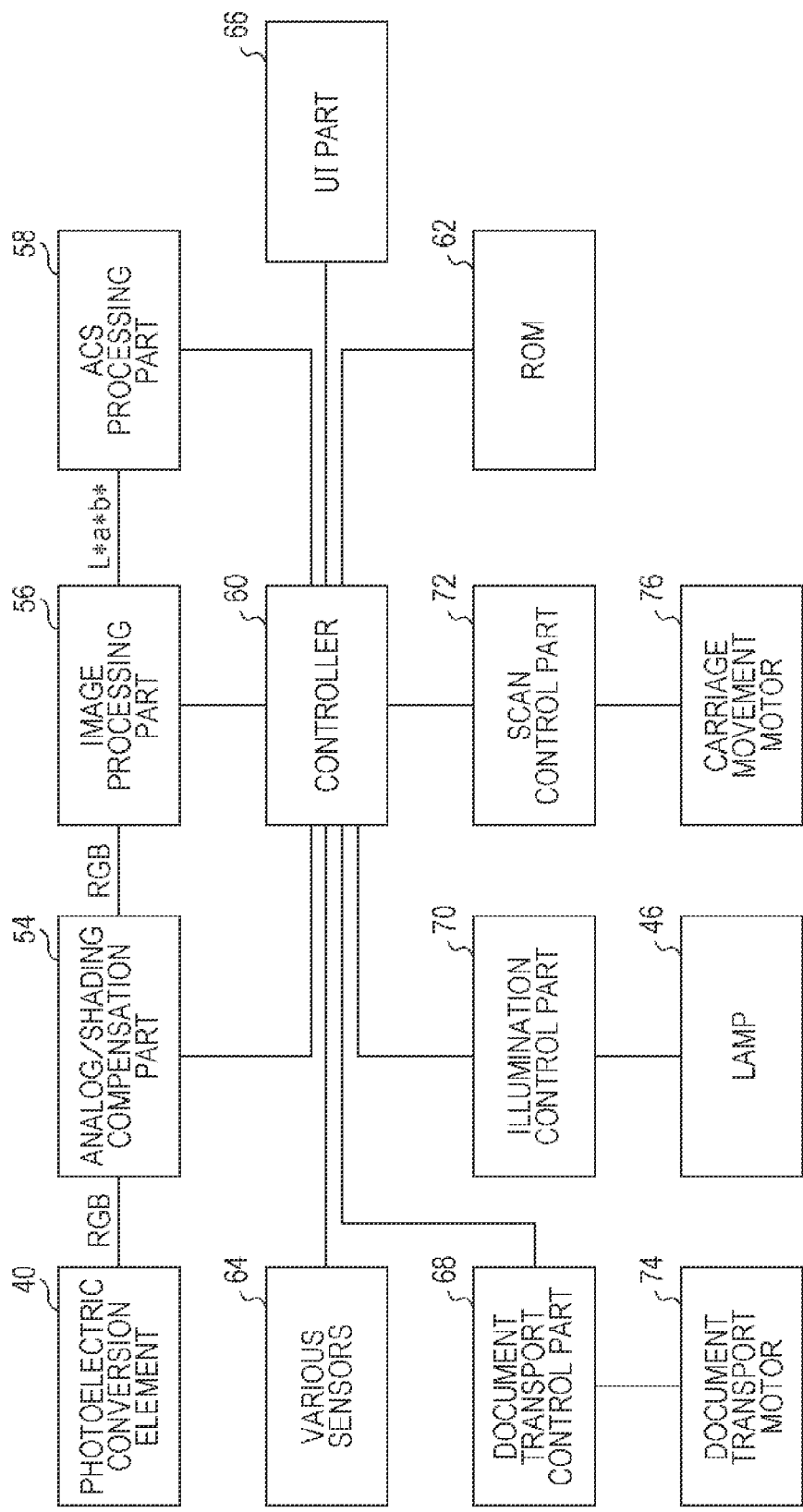
FIG. 2 is a block diagram illustrating an example of the configuration of the electrical system of the image reading apparatus according to the exemplary embodiment.

For example, as illustrated in FIG. 2, the analog image signal output by the photoelectric conversion element 40 is supplied to an analog/shading compensation part 54. The analog/shading compensation part 54 applies processes such as automatic gain control (AGC) and automatic offset control (AOC) to the analog image signal supplied from the photoelectric conversion element 40, and then applies A/D conversion to the resulting signal. The analog/shading compensation part 54 also applies shading compensation to a digital image signal (digital RGB signal), which is obtained by converting analog values into digital multi-valued information by the above-mentioned A/D conversion.

The digital image signal compensated in this way is sent to an image processing part 56. The image processing part 56 applies various processes to the digital image signal (digital RGB signal) supplied from the analog/shading compensation part 54. An example of a process in the image processing part 56 is color conversion from the RGB color system into the L*a*b* color system. This color conversion process converts the digital RGB signal into multi-valued information including L* that represents lightness and a* and b* that represent hue and chroma. The image signal obtained by this conversion (to be referred to as "L*a*b* signal" hereinafter) is sent to an ACS processing part 58, which is an example of an output unit according to the exemplary embodiment of the invention.

The ACS processing part 58 is implemented by an application-specific integrated circuit (ASIC). The ACS processing part 58 takes in the L*a*b* signal generated via the analog/shading compensation part 54 and the image processing part 56 from a signal output from the photoelectric conversion element 40. Then, the ACS processing part 58 performs a discrimination process that discriminates whether the document being read is a color document or monochrome document. Whether the document being read is a color document or monochrome document may be discriminated by using information such as an image signal input from the image processing part 56, a pixel color determination threshold described later, a block color determination threshold described later, and a document color determination threshold described later.

The term "document being read" refers to the following document. In the first reading mode, the term refers to a document that is read while being placed on the first document glass 16. In the second reading mode, the term refers to a document that is set on the document setting part 20, delivered by the document transport part 24 onto the second document glass 18 from the document setting part 20, and then read via the optical scanning system while moving on the second document glass 18.

A controller 60 includes, for example, a central processing unit (CPU). The controller 60 controls the overall operation of the image reading apparatus 10 in a centralized manner in accordance with a control program stored in a read-only memory (ROM) 62. Various sensors 64 include sensors necessary for controlling the overall operation of the image reading apparatus 10. A user interface (UI) part 66 is an operating panel (control panel) including an input part such as a button or switch, a display, and the like. The UI part 66 is used when the user specifies operation information for operating the image reading apparatus 10.

The controller 60 receives detection signals from the various sensors 64 and an operation signal from the UI part 66. The various sensors 64 include, for example, an open/close detection sensor that detects the open/close state of the document pressing part 14, a document size detection sensor that detects the document size of the document being read, a first document presence sensor (which may double as the document size detection sensor) that detects whether a document is set on the document setting part 20, a second document presence sensor (which may double as the document size detection sensor) that detects whether a document is placed on the first document glass 16, a carriage position detection sensor that detects the position of each of the carriages 42 and 44 in the first scanning direction, and a jam sensor that detects a document jam or the like in the document transport part 24.

In response to detection signals input from the various sensors 64, the controller 60 selects either one of the first reading mode and the second reading mode as the mode for reading a document. The first reading mode refers to an operation mode in which a document placed on the first document glass 16 is read by moving the optical scanning system 36 from a predetermined home position (the left end in FIG. 1) in the first scanning direction Y along the first document glass 16. The second reading mode refers to an operation mode in which a document moving on the second document glass 18 owing to transport by the document transport part 24 is read while making the optical scanning system 36 remain still at a predetermined position (the home position or its vicinity) in the first scanning direction Y. In this second reading mode, the document is read at the position directly above the first mirror 48 equipped to the full rate carriage 42.

Selection of a reading mode in the controller 60 is performed on the basis of, for example, a detection signal from the first document presence sensor. That is, if it is determined by the detection signal from the first document presence sensor that a document is being set on the document setting part 20, the controller 60 selects the second reading mode, and if it is determined that a document is not being set on the document setting part 20, the controller 60 selects the first reading mode. This reading mode selection process by the controller 60 is executed when the user depresses a Start button provided in the UI part 66. As the sensor detection signal to be referenced during this reading mode selection process, a detection signal from the second document presence sensor may be used instead of a detection signal from the first document presence sensor. Alternatively, detection signals from both the first and second document presence sensors may be used.

A document transport control part 68, an illumination control part 70, and a scan control part 72 each control the operation of a controlled part in accordance with a control instruction from the controller 60. That is, the document transport control part 68 controls, with the document transport part 24 equipped to the document pressing part 14 as a controlled part, the rotational operation of a document transport motor 74 that serves as the drive source for the document transport control part 68. The illumination control part 70 controls, with the lamp 46 equipped to the full rate carriage 42 as a controlled part, the On/Off (lighting or extinguishing) operation of the lamp 46. The scan control part 72 controls, with each of the carriages 42 and 44 of the optical scanning system 36 as a controlled part, the rotational operation of a carriage movement motor 76 that serves as the drive source for moving the carriages. A control motor such as a pulse motor is used as the document transport motor 74 or the carriage movement motor 76.

Figure 3:
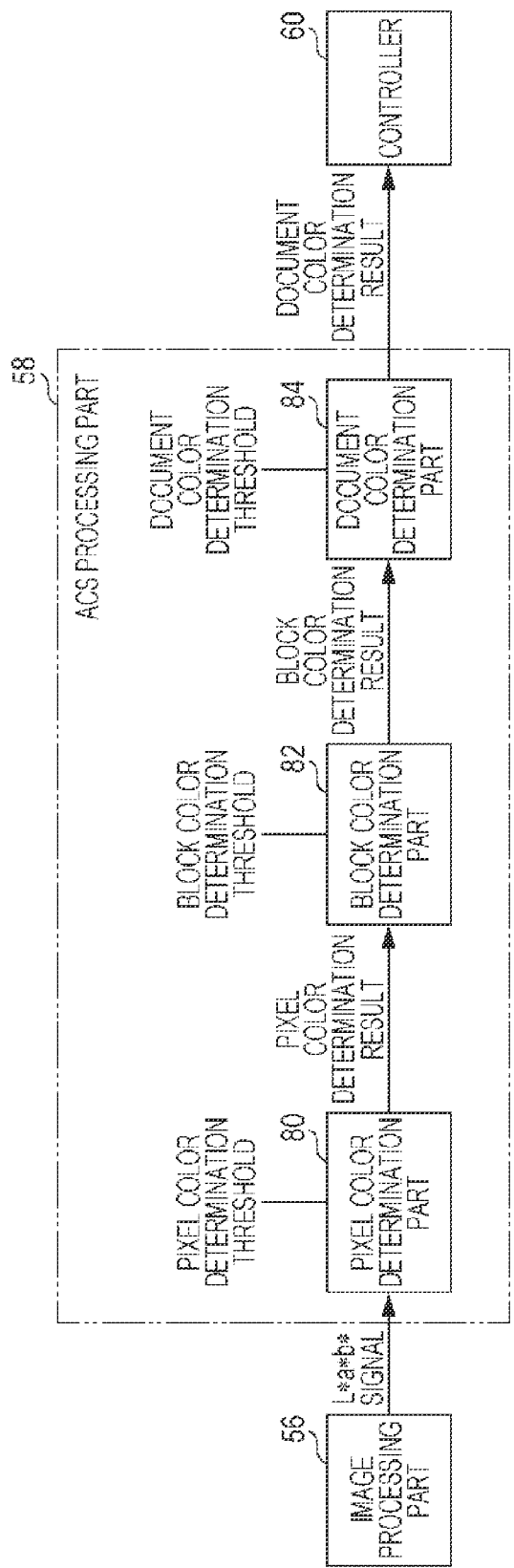
FIG. 3 is a block diagram illustrating an example of functions of an ACS processing part included in the image reading apparatus according to the exemplary embodiment.

For example, as illustrated in FIG. 3, the ACS processing part 58 includes a pixel color determination part 80, a block color determination part 82, and a document color determination part 84.

Figure 4:
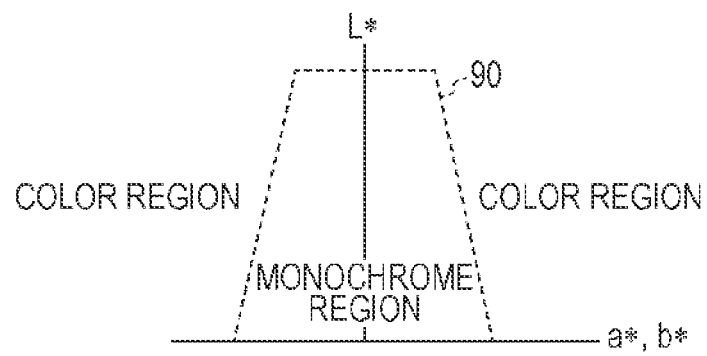
FIG. 4 conceptually illustrates an example of a determination region used for determining the color of a pixel by a pixel color determination part included in the ACS processing part according to the exemplary embodiment.

The pixel color determination part 80 determines whether each pixel of the L*a*b* signal input from the image processing part 56 is a color pixel or monochrome pixel. A pixel color determination threshold is used for the determination in the pixel color determination part 80. As illustrated in FIG. 4 by way of example, the pixel color determination threshold is a value for setting (plotting), in the L*a*b* uniform color space, a determination region 90 in the shape of a circle, a polygon, or the like in the chromaticity plane representing hue and chroma.

The pixel color determination part 80 compares the chromaticity information of each pixel with the pixel color determination threshold. Then, the pixel color determination part 80 determines a pixel to be a monochrome pixel if the pixel is included in the determination region 90 set by the pixel value determination threshold, and determines a pixel to be a color pixel if the pixel is not included in the determination region 90. A pixel color determination result, which is the result of determination by the pixel color determination part 80, is sent to the block color determination part 82. The term "monochrome" as used herein is an example of an achromatic color according to the exemplary embodiment of the invention, and the term "color" as used herein is an example of a chromatic color according to the exemplary embodiment of the invention.

The block color determination part 82 sets a read image, which is an image obtained by reading a document, as a region for which to perform block color determination. The block color determination part 82 segments the read image into blocks each defined as a matrix of N pixels in the first scanning direction Y×M pixels in a second scanning direction X, and determines whether each of the blocks is a color block or monochrome block. To determine the color of each block (color/monochrome determination), the block color determination part 82 uses a block color determination threshold, which is an example of a threshold according to the exemplary embodiment of the invention.

The block color determination by the block color determination part 82 is performed block by block on the basis of a pixel color determination result supplied from the pixel color determination part 80. That is, for multiple blocks obtained by the above-mentioned segmentation, the block color determination part 82 counts how many of multiple pixels included in each of the blocks are determined to be color pixels or monochrome pixels by the pixel color determination part 80. The block color determination part 82 then compares this count value with a predetermined block color determination threshold, and determines whether a block is a color block or monochrome block on the basis of the result of this comparison. For example, if the block color determination part 82 is to count color pixels, the number of color pixels actually counted within each block and the block color determination threshold are compared to see which is greater or less than the other. If the number of color pixels is greater than or equal to the block color determination threshold, the corresponding block is determined as a color block, and if the number of color pixels is less than the block color determination threshold, the corresponding block is determined as a monochrome block. A block color determination result, which is the result of determination by the block color determination part 82, is sent to the document color determination part 84. The block color determination result is an example of color information according to the exemplary embodiment of the invention.

The document color determination part 84 determines whether the document being read is a color document or monochrome document on the basis of the block color determination result supplied from the block color determination part 82. To determine the color of the document (color/monochrome determination), the document color determination part 84 uses a document color determination threshold, which is an example of a reference value according to the exemplary embodiment of the invention. As the document color determination threshold, a value determined in accordance with the document size of the document being read is used, irrespective of the reading mode selected by the controller 60.

The determination by the document color determination part 84 is performed in the following manner on the basis of a block color determination result supplied from the block color determination part 82. That is, the document color determination part 84 counts how many blocks are determined as color blocks or monochrome blocks by the block color determination part 82, among multiple blocks into which the read image of the document being read is segmented. The document color determination part 84 then compares this count value with a predetermined document color determination threshold, and determines whether a block is a color block or monochrome block on the basis of the result of this comparison. For example, if the document color determination part 84 is to count color blocks, the number of color blocks actually counted within a read region and the document color determination threshold are compared to see which is greater or less than the other. If the number of color blocks is greater than or equal to the document color determination threshold, the document being read is determined to a color document, and if the number of color blocks is less than the document color determination threshold, the document being read is determined as a monochrome document. The result of document color determination by the document color determination part 84 is sent to the controller 60 as the final result of document color determination in the ACS processing part 58, and used when, for example, an image is generated by an image forming apparatus or the like. The document determination result is an example of chromatic color identifying information and achromatic color identifying information according to the exemplary embodiment of the invention.

In the image reading apparatus 10, the transport speed of the document may sometimes temporarily fluctuate when the document leaves rollers that transport the document. Because the positions of the rollers that transport the document vary for each model of apparatus, the manner in which the transport speed of the document fluctuates temporarily varies in accordance with characteristics unique to the document transport part 24. Further, in some cases, vibration caused by external force applied to the document transport part 24 causes the transport speed of the document to fluctuate. At this time, the amplitude of vibration and the number of vibrations per unit time also vary in accordance with unique characteristics of the document transport part 24. Such speed fluctuations during document transport adversely affect line-to-line gap correction in a case where the photoelectric conversion element 40 is used. As a result, a line-shaped color misregistration is sometimes mixed into the read image.

Figure 5:
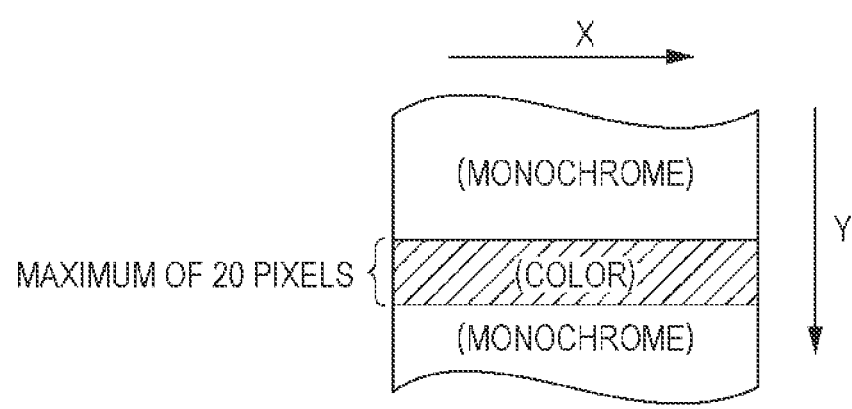
FIG. 5 conceptually illustrates an example of a color misregistration occurring in an image obtained by reading a monochrome image.

For example, color misregistration refers to the following phenomenon. That is, although a read image obtained by reading a monochrome document would normally be reproduced as a monochrome image, as illustrated in FIG. 5 by way of example, a color image with a maximum of 20 pixels is mixed into the read image in the first scanning direction Y.

Figure 6:
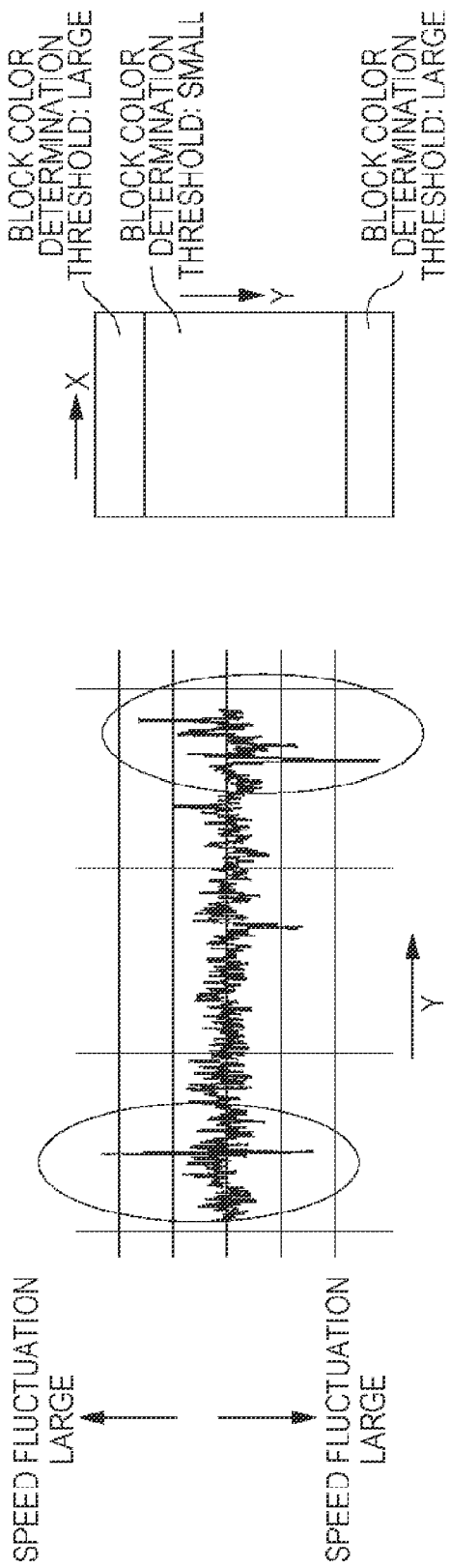
FIG. 6 is a graph used for explaining related art.
Figure 7:
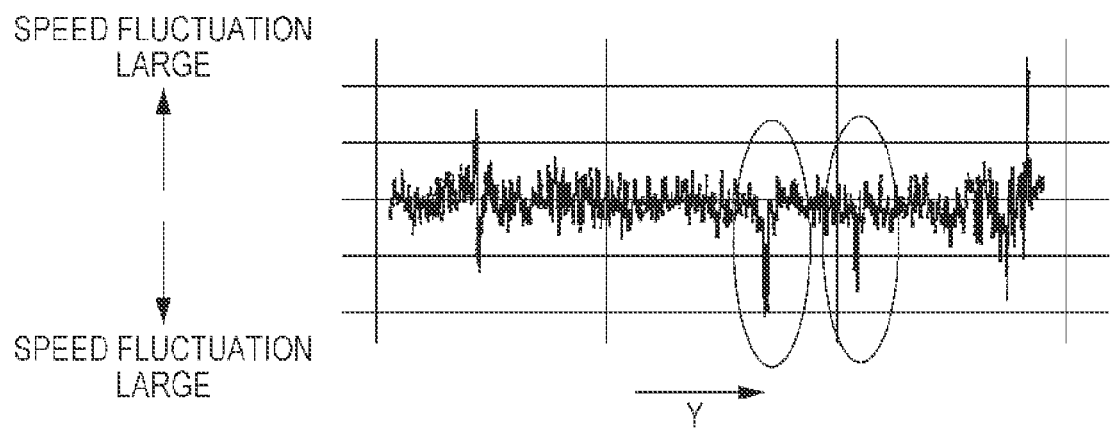
FIG. 7 is a graph illustrating an example of changes in the transport speed of a document with time.
Figure 8:
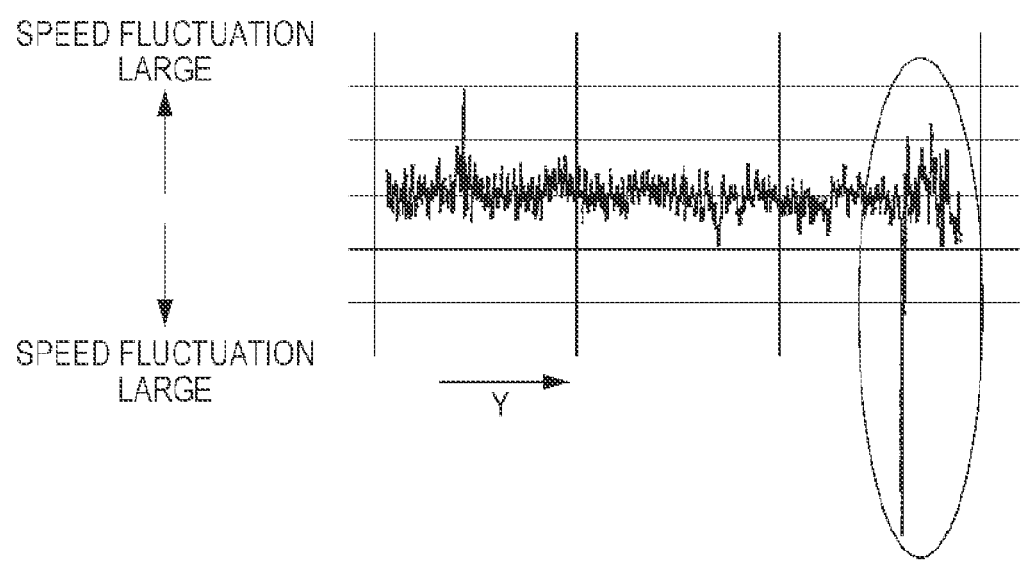
FIG. 8 is a graph illustrating an example of changes in the transport speed of a document with time, for a case where a greater fluctuation in transport speed occurs in comparison to FIGS. 6 and 7.

If color misregistration occurs as mentioned above, the color of the document obtained as the final result of determination by the ACS process sometimes differ from the actual color of the document. Accordingly, various methods have been proposed to reduce such erroneous determination. For example, as illustrated in FIG. 6 by way of example, a technique exists which takes note of the fact that fluctuations in transport speed tend to occur in the leading and trailing edge portions of the document, and accordingly applies a larger block color determination threshold to the reading result of the leading and trailing edge portions of the document, than the block color determination threshold applied to other regions of the document. Further, as illustrated in FIG. 7 by way of example, fluctuations in transport speed sometimes also take place in the middle portion of the document. In this case, the block color determination threshold applied to the reading result of the middle portion of the document also needs to be set in the same manner as the block color determination threshold applied to the reading result of the edge portions of the document. Further, as illustrated in FIG. 8 by way of example, in comparison to the examples illustrated in FIGS. 6 and 7, a large fluctuation in speed can sometimes occur locally. In this case, it would be conceivable to forcibly cause a block to be determined as monochrome so that a monochrome block is not erroneously determined as a color block. However, adopting this method may result in a color document being erroneously determined as monochrome.

Figure 12:
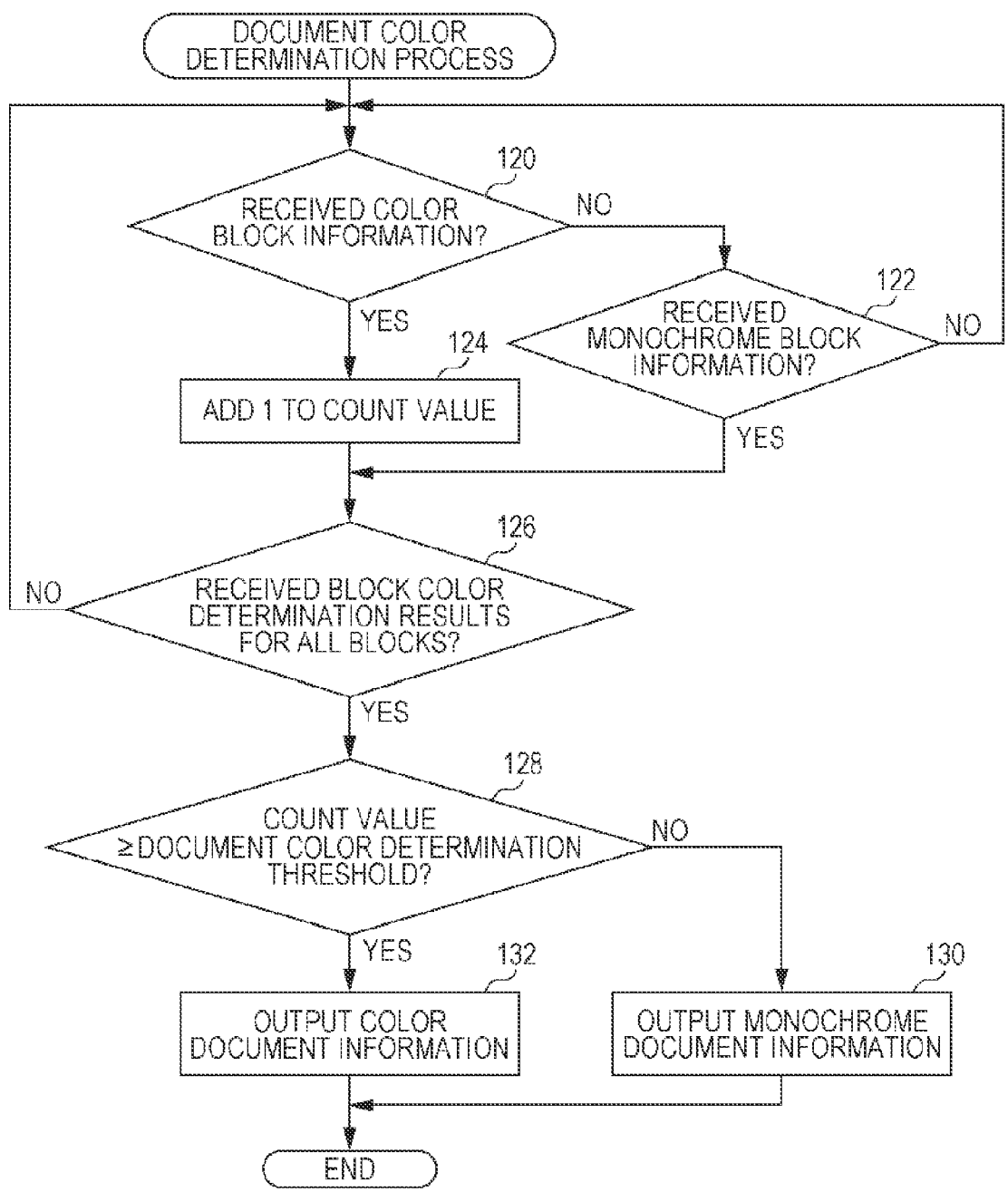
FIG. 12 is a flowchart illustrating an example of the flow of a block color determination process according to the exemplary embodiment.

Accordingly, in the exemplary embodiment, the block color determination part 82 performs a block color determination process (see FIG. 9), and the document color determination part 84 performs a document color determination process (see FIG. 12).

Figure 9:
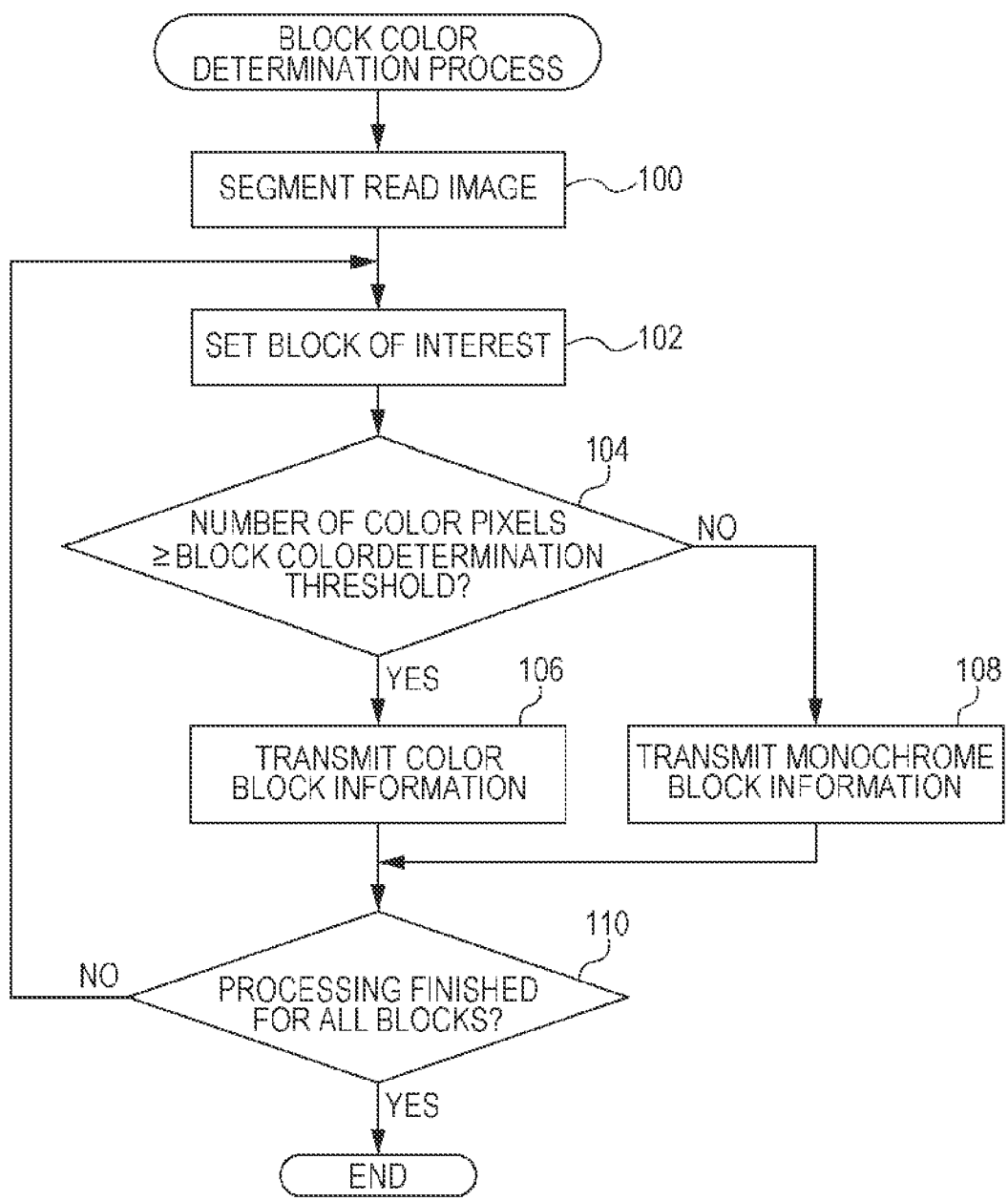
FIG. 9 is a flowchart illustrating an example of the flow of a block color determination process according to the exemplary embodiment.

Next, referring to FIG. 9, the following describes a block color determination process executed by the block color determination part 82 that has received the pixel color determination results for the entire region of a read image. For the convenience of explanation, a case where the document is read in the second reading mode is described below.

Figure 10:
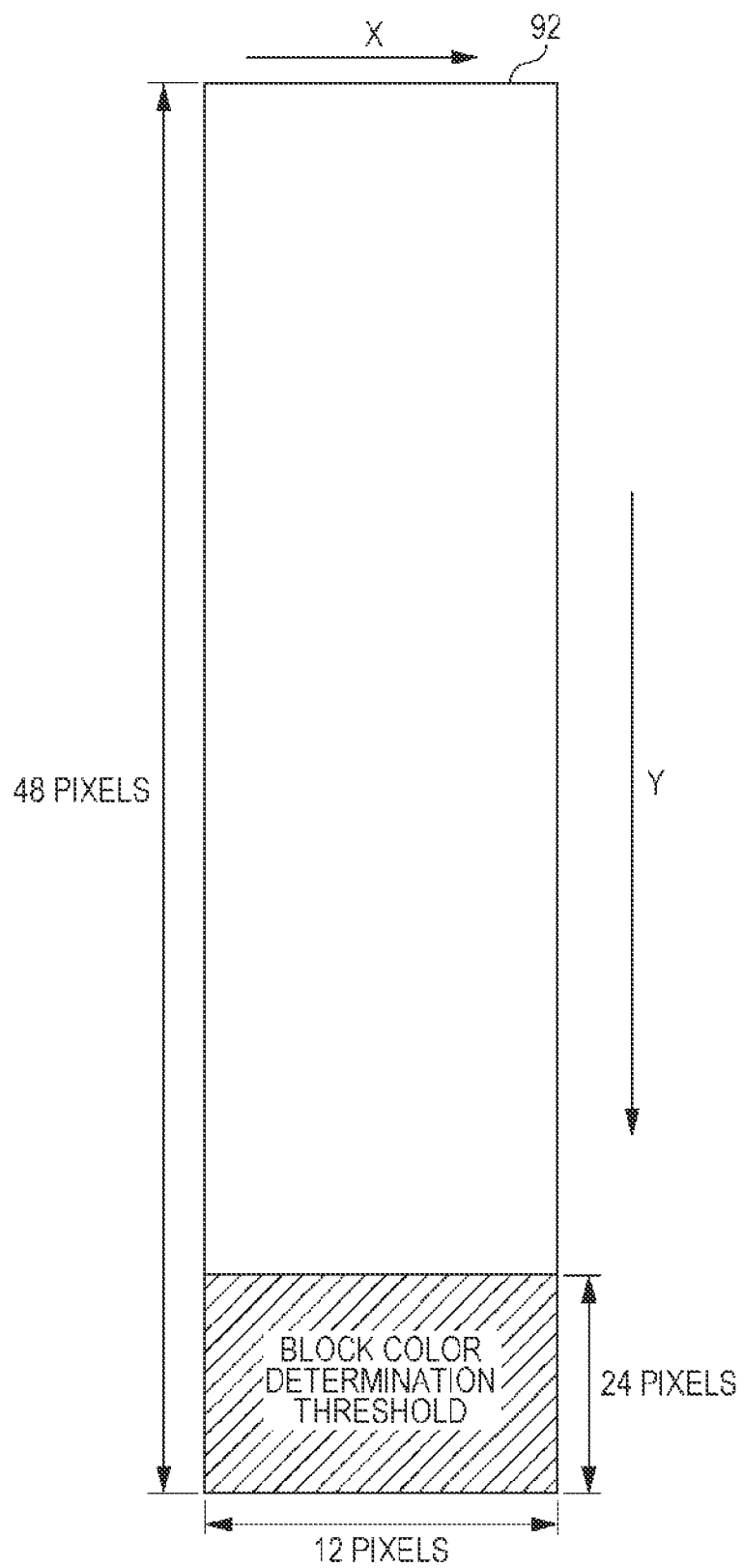
FIG. 10 conceptually illustrates an example of a block and a block color determination threshold that are used in a block color determination part included in the ACS processing part according to the exemplary embodiment.

In the block color determination process illustrated in FIG. 9, first, in step 100, the block color determination part 82 segments a read image into multiple blocks 92 (see FIG. 10).

For example, as illustrated in FIG. 10, the block 92 is a rectangular block defined as 48 pixels in the first scanning direction Y×12 pixels in the second scanning direction X. In the example illustrated in FIG. 10, the 48 pixels in the first scanning direction Y of the block 92 is an example of an interval according to the exemplary embodiment of the invention. In the example illustrated in FIG. 10, the length in each of the second scanning direction X and first scanning direction Y of the block 92 is specified in number of pixels. However, the length in each of the second scanning direction X and first scanning direction Y of the block 92 may be specified in the metric system.

Figure 11:
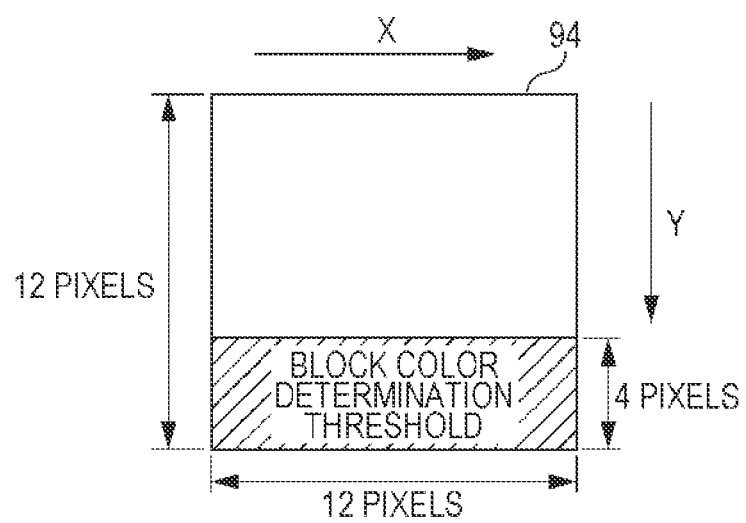
FIG. 11 conceptually illustrates an example of a block and a block color determination threshold that are used for determination of a block color according to related art.

As illustrated in FIG. 11 as a related art example, a block 94 according to related art is a square block of 12 pixels in each of the first scanning direction Y and the second scanning direction X. The number of pixels in the first scanning direction Y of the block 94 is less than 20 (see FIG. 5), which is the number of pixels in the first scanning direction Y of the maximum color misregistration assumed (expected) in the first scanning direction Y. In contrast, in the block 92 adopted in step 100 mentioned above, the number of pixels in the first scanning direction Y is 48, which exceeds 20. Therefore, for example, when a monochrome document image is read, if a color misregistration area is cut by the block 94, the block 94 is filled with color pixels. However, if the color misregistration area is cut by the block 92, the block 92 is not filled with color pixels.

In the next step 102, the block color determination part 82 sets, as a block of interest, one block 92 whose block color has not been determined yet in step 104 described later, among the multiple blocks 92 obtained by the segmentation in step 100.

In the next step 104, the block color determination part 82 determines whether the number of color pixels in the block of interest set in step 102 is greater than or equal to a block color determination threshold. Each color pixel in the block of interest is identified from the pixel color determination result supplied from the pixel color determination part 80. In this step 104, as illustrated in FIG. 10 by way of example, the block color determination threshold is a value corresponding to a pixel count of 24 pixels in the first scanning direction Y×12 pixels in the second scanning direction X.

If, in step 104, the number of color pixels in the block of interest set in step 102 is greater than or equal to the block color determination threshold, the block of interest is determined as a color block, and the processing transfers to step 106. If, in step 104, the number of color pixels in the block of interest set in step 102 is less than the block color determination threshold, the block of interest is determined as a monochrome block, and the processing transfers to step 108.

As illustrated in FIG. 11 as a related art example, the block color determination threshold according to related art is a value corresponding to a pixel count of 4 pixels in the first scanning direction Y×12 pixels in the second scanning direction X. Thus, the number of pixels in the first scanning direction Y which defines the block color determination threshold is less than 20. Therefore, for example, when a monochrome document is read, if a color misregistration area of 20 pixels in the first scanning direction is cut by the block 94, the block 94 including the color misregistration area is determined as a color block. In contrast, as illustrated in FIG. 10, the number of pixels in the first scanning direction Y of the block 94 which defines the block color determination threshold is 24, which exceeds 20. Therefore, for example, when a monochrome document is read, even if a color misregistration area of 20 pixels in the first scanning direction is cut by the block 92, the block 92 including the color misregistration area is not determined as a color block.

In step 106, the block color determination part 82 transmits, as a block color determination result, color block information indicating that the block of interest is a color block. Then, the processing transfers to step 110.

In step 108, the block color determination part 82 transmits, as a block color determination result, color block information indicating that the block of interest is a monochrome block. Then, the processing transfers to step 110.

In step 110, the block color determination part 82 determines whether all of the multiple blocks 92 obtained by the segmentation in step 100 have been set as blocks of interest. If, in step 110, not all of the multiple blocks 92 obtained by the segmentation in step 100 have been set as blocks of interest, a negative determination is made, and the processing proceeds to step 102. If, in step 110, all of the multiple blocks 92 obtained by the segmentation in step 100 have been set as blocks of interest, an affirmative determination is made, and the block color determination process is ended.

Next, referring to FIG. 12, the following describes a document color determination process executed by the document color determination part 84 when execution of the block color determination process is started.

In the document color determination process illustrated in FIG. 12, first, in step 120, the document color determination part 84 determines whether the document color determination part 84 has received color block information transmitted as a result of execution of step 106 by the block color determination part 82. If, in step 120, the document color determination part 84 has not received color block information transmitted as a result of execution of step 106 by the block color determination part 82, a negative determination is made, and the processing transfers to step 122. If, in step 120, the document color determination part 84 has received color block information transmitted as a result of execution of step 106 by the block color determination part 82, an affirmative determination is made, and the processing transfers to step 124.

In step 122, the document color determination part 84 determines whether the document color determination part 84 has received monochrome block information transmitted as a result of execution of step 108 by the block color determination part 82. If, in step 122, the document color determination part 84 has not received monochrome block information transmitted as a result of execution of step 108 by the block color determination part 82, a negative determination is made, and the processing transfers to step 120. If, in step 122, the document color determination part 84 has received monochrome block information transmitted as a result of execution of step 108 by the block color determination part 82, an affirmative determination is made, and the processing transfers to step 126.

In step 124, the document color determination part 84 adds 1 to the count value of a counter (not illustrated), and then the processing transfers to step 126. The count value is initially set to "0".

In step 126, the document color determination part 84 determines whether the document color determination part 84 has received color block information or monochrome block information representing the block color determination results for all of the blocks obtained in step 100 of the block color determination process. If, in step 126, the document color determination part 84 has not received color block information or monochrome block information representing the block color determination results for all of the blocks obtained in step 100 of the block color determination process, a negative determination is made, and the processing transfers to step 120. If, in step 126, the document color determination part 84 has received color block information or monochrome block information representing the block color determination results for all of the blocks obtained in step 100 of the block color determination process, an affirmative determination is made, and the processing transfers to step 128.

In step 128, the document color determination part 84 determines whether a count value, which is an example of an output quantity according to the exemplary embodiment of the invention, is greater than or equal to a document color determination threshold. If, in step 128, the count value is less than the document color determination threshold, the document read by the image reading apparatus 10 is determined as a monochrome document, and the processing transfers to step 130. If, in step 128, the count value is greater than or equal to the document color determination threshold, the document read by the image reading apparatus 10 is determined as a color document, and the processing transfers to step 132.

The document color determination threshold is a value determined in accordance with the number of pixels in the first scanning direction Y of the block 92. That is, the document color determination threshold is a value that is determined in advance so as to decrease with an increase in the number of pixels in the first scanning direction Y of the block 92. For example, the document color determination threshold used in step 128 mentioned above is smaller than the document color determination threshold used in a case where the color of the document is determined on the basis of a determination result obtained by determining the color of the block 94.

In step 130, the document color determination part 84 outputs monochrome document information, which indicates that the document read by the image reading apparatus 10 is a monochrome document, to the controller 60 as a document color determination result, and then ends the document color determination process.

In step 132, the document color determination part 84 outputs color document information, which indicates that the document read by the image reading apparatus 10 is a color document, to the controller 60 as a document color determination result, and then ends the document color determination process.

For the convenience of explanation, the foregoing exemplary embodiment is directed to the case where the document is read in the second reading mode. However, the exemplary embodiment of the invention is not limited to this. That is, even when the document is read in the first reading mode, it is expected that the full rate carriage 42 or the half rate carriage 44 vibrates during movement. Accordingly, the block color determination process and the document color determination process may be executed also in the first reading mode. As described above, it may suffice that the block color determination process and the document color determination process be executed while relative movement takes place between the document and the optical scanning system 36.

The amplitude of vibration of the full rate carriage 42 or the half rate carriage 44 and the number of vibrations per unit time during movement vary in accordance with unique characteristics of the full rate carriage 42 or the half rate carriage 44. A case may also arise in which the document transport part 24 vibrates in the second reading mode. In this case as well, the amplitude of vibration, the number of vibrations per unit time, and the like during document transport also vary in accordance with unique characteristics of the document transport part 24.

In the foregoing exemplary embodiment, the blocks 92 into which a read image is segmented each have 48 pixels in the first scanning direction Y. However, this is only illustrative. The number of pixels in the first scanning direction Y of the block 92 may be any number that exceeds the number of pixels in the first scanning direction Y of the maximum color misregistration assumed in the first scanning direction Y, and may be customized within this range in accordance with an instruction accepted by the UI part 66.

In the foregoing exemplary embodiment, the block 92 has 12 pixels in the second scanning direction X. However, this is only illustrative. The number of pixels in the second scanning direction X of the block may be greater than or equal to 12, or less than 12, and may be customized in accordance with an instruction accepted by the UI part 66.

While the foregoing exemplary embodiment is directed to the case where the block 92 is a rectangle that is longer in the first scanning direction Y than in the second scanning direction X, the exemplary embodiment of the invention is not limited to this. For example, a block in another shape, such as a square, a parallelogram, or a trapezoid may be used. In this case as well, the length in the first scanning direction Y of the block (the height of the block) is greater than a length (for example, 20 pixels) expected in advance through testing, simulation, or the like as the length in the first scanning direction Y of a color misregistration.

In the foregoing exemplary embodiment, the number of pixels in the first scanning direction Y which defines the block color determination threshold is 24. However, this is only illustrative. The number of pixels in the first scanning direction Y which defines the block color determination threshold may be any number that is less than or equal to the number of pixels in the first scanning direction Y of the block, and greater than the number of pixels in the first scanning direction Y of the maximum color misregistration assumed in the first scanning direction Y. Further, the above-mentioned number may be customized within this range in accordance with an instruction accepted by the UI part 66.

In the foregoing exemplary embodiment, the number of pixels in the second scanning direction X which defines the block color determination threshold is 12. However, this is only illustrative. The number of pixels in the second scanning direction X which defines the block color determination threshold may be greater than or equal to 12, or less than 12, and may be customized in accordance with an instruction accepted by the UI part 66.

The foregoing exemplary embodiment is directed to the case where the block color determination process and the document color determination process are executed for the entire region of a read image. However, the exemplary embodiment of the invention is not limited to this. For example, if the position where the transport speed of the document fluctuates is recognized in advance, the block color determination process and the document color determination process may be executed only for a partial region of the read image corresponding to a position previously determined as the position where the transport speed of the document fluctuates. The length in the first scanning direction Y of the partial region, which may be a length corresponding to multiple blocks or a single block, may be determined in accordance with the position where the transport speed of the document fluctuates and the amount of fluctuation. Further, a block (for example, the block 94) other than the block 92 may be applied to regions other than the partial region.

The foregoing exemplary embodiment is directed to the case where a read image is segmented into multiple blocks 92 in the second scanning direction X, that is, the case where the length in the second scanning direction X of the block 92 is shorter than the width of the read image. However, the exemplary embodiment of the invention is not limited to this. The length in the second scanning direction X of the block 92 may be made equal to the width of the read image.

In the exemplary embodiment, the number of pixels in the first scanning direction Y of the maximum color misregistration assumed in the first scanning direction Y is 20. However, this is only illustrative. The number of pixels in the first scanning direction Y of the maximum color misregistration assumed in the first scanning direction Y may be determined for each image reading apparatus 10, or may be determined for each model of the image reading apparatus 10.

The foregoing exemplary embodiment is directed to the case of a reading system in which an image is read when the photoelectric conversion element 40 receives reflected light obtained by irradiating the document with white light. However, the exemplary embodiment of the invention is also applicable to other reading systems. An example of other reading systems is a line sequential system. The line sequential system refers to a system with which R, G, and B light sources are switched and lit for each one line to read one line linearly by one read operation.

The foregoing exemplary embodiment is directed to the case where the block color determination process illustrated in FIG. 9 and the document color determination process illustrated in FIG. 12 are performed. However, the process flows illustrated in FIGS. 9 and 12 are only illustrative. It is needless to mention that unnecessary steps may be removed, new steps may be added, or the sequence of processing steps may be interchanged without departing from the scope of the exemplary embodiment.

In the foregoing exemplary embodiment, the block color determination process and the document color determination process are implemented by an ASIC. However, the exemplary embodiment is not limited to this. The block color determination process and the document color determination process may be implemented by a software configuration in which a program is executed by a computer, or may be implemented by combination of a software configuration and a hardware configuration.

Figure 13:
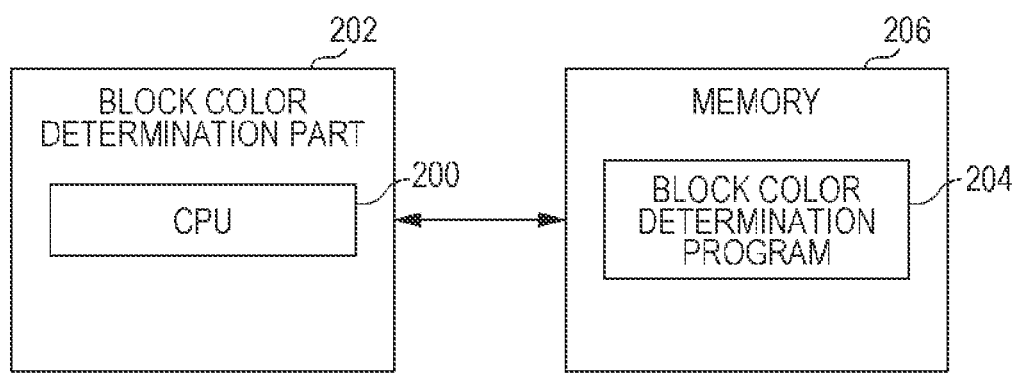
FIG. 13 is a block diagram illustrating an example of a configuration for implementing, by a software configuration, each process included in a block color determination process according to the exemplary embodiment.

To implement each process included in the block color determination process by a software configuration, for example, as illustrated in FIG. 13, a block color determination part 202 including a CPU 200, and a memory 206 in which a block color determination program 204 is stored may be used. The memory 206 is connected to the block color determination part 202. The block color determination process according to the foregoing exemplary embodiment is implemented by execution of the block color determination program 204 by the CPU 200.

Figure 14:
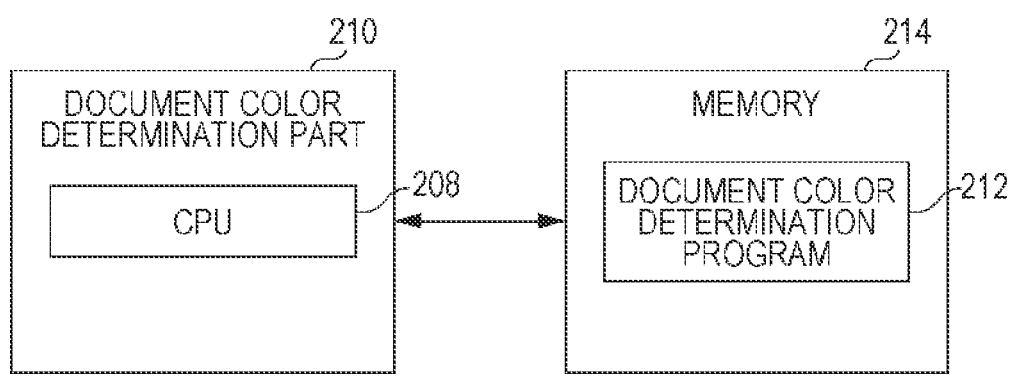
FIG. 14 is a flowchart illustrating an example of the flow of a document color determination process according to the exemplary embodiment.

To implement each process included in the document color determination process by a software configuration, for example, as illustrated in FIG. 14, a document color determination part 210 including a CPU 208, and a memory 214 in which a document color determination program 212 is stored may be used. The memory 214 is connected to the document color determination part 210. The document color determination process according to the foregoing exemplary embodiment is implemented by execution of the document color determination program 212 by the CPU 208.

While FIGS. 13 and 14 each illustrate a state in which the program is stored in the memory 206 or 214, he program may not necessarily be stored in the memory 206 or 214 from the beginning. For example, the program may be stored first on a portable storage medium that is connected to the image reading apparatus 10 for use. Then, the CPU 200 or 208 may acquire the program from such a portable storage medium and execute the acquired program. Alternatively, the program may be stored in the memory of an external computer such as a computer or server apparatus connected to the image reading apparatus 10 via a communication unit. In this case, the CPU 200 or 208 acquires the program from the external computer and execute the acquired program.

Figure 15:
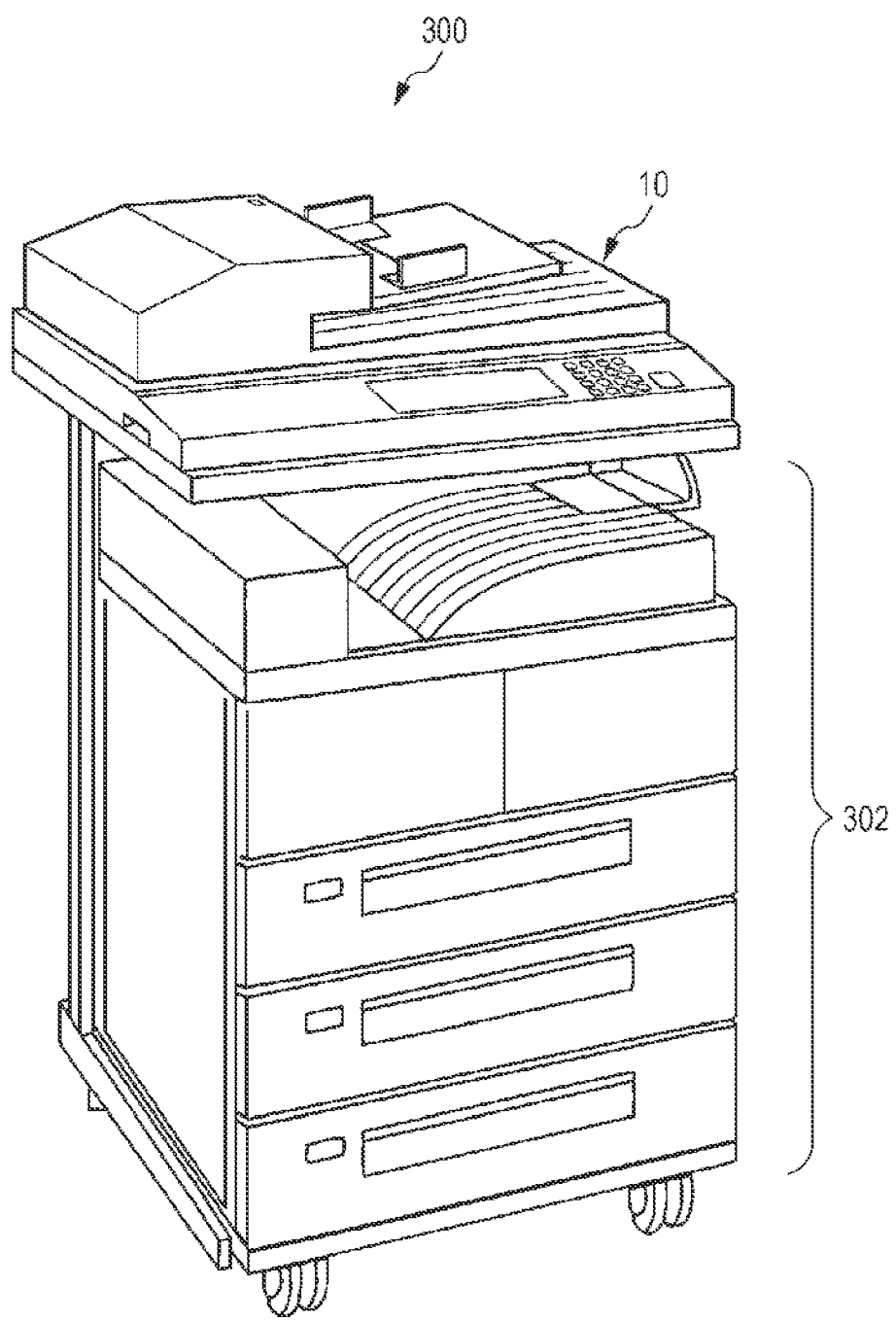
FIG. 15 is a schematic perspective view illustrating an example of the outward appearance of an image forming apparatus incorporating the image reading apparatus according to the exemplary embodiment.

While the foregoing exemplary embodiment is directed to the image reading apparatus 10, as illustrated in FIG. 15 by way of example, the exemplary embodiment of the invention is also applicable to an image forming apparatus 300 in which the image reading apparatus 10 is incorporated.

The image forming apparatus 300 includes the image reading apparatus 10, and an image forming part 302 that is an example of an image forming unit according to the exemplary embodiment of the invention. The image forming part 302 prints an image on a sheet by the electrophotographic system. That is, the image forming part 302 forms an electrostatic latent image on a photoconductor drum on the basis of read data that is finally output when the document is read by the image reading apparatus 10, and then develops the electrostatic latent image with toner to form a toner image. Then, the image forming part 302 transfers the toner image to a supplied sheet, fixes the toner image onto the sheet, and then discharges the resulting sheet.

The read data finally output to the image forming part 302 by the image reading apparatus 10 is the read data for which the color of the document has been identified on the basis of a document color determination result. Further, while the foregoing description is directed to the image forming apparatus 300 that adopts the image forming part 302 based on the electrophotographic system, it is needless to mention that the image forming apparatus 300 may be an image forming apparatus based on the inkjet system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a reading unit that reads a plurality of colors in a document;
a relative movement unit that causes the reading unit and the document to make a relative movement in a first scanning direction; and
an output unit that outputs color information at an interval, the color information indicating whether the document read by the reading unit is chromatic, the interval being longer in the first scanning direction than a length in the first scanning direction of a color misregistration, the color misregistration being expected to occur in an image if a speed of the relative movement fluctuates owing to a unique performance characteristic of the relative movement unit, the image being obtained as a result of reading by the reading unit.

2. The image reading apparatus according to claim 1, wherein the output unit outputs the color information at a plurality of the intervals in the image.

3. The image reading apparatus according to claim 2, wherein the output unit outputs the color information at a plurality of the intervals for an entire region of the image.

4. The image reading apparatus according to claim 1, wherein the output unit outputs chromatic color identifying information if an output quantity of the color information indicating a chromatic color is greater than or equal to a reference value, the chromatic color identifying information identifying a color of the image as chromatic, and outputs achromatic color identifying information if the output quantity is less than the reference value, the achromatic color identifying information identifying a color of the image as achromatic.

5. The image reading apparatus according to claim 4, wherein the reference value is a predetermined value that decreases with an increase in the interval.

6. The image reading apparatus according to claim 1, wherein the interval includes a number of pixels in the first scanning direction which exceeds a number of pixels in the first scanning direction of the color misregistration.

7. The image reading apparatus according to claim 1, wherein the output unit outputs color information indicative of a chromatic color as the color information, if the interval includes a number of pixels of a chromatic color in the first scanning direction which exceeds a number of pixels in the first scanning direction of the color misregistration.

8. The image reading apparatus according to claim 1, wherein:
the relative movement unit has a transport unit that transports the document in the first scanning direction; and
the relative movement is achieved by transport of the document by the transport unit.

9. An image forming apparatus comprising:
the image reading apparatus according to claim 1; and
an image forming unit that forms an image on a basis of a reading result obtained by the reading unit of the image reading apparatus, and the color information output by the output unit.

10. An image reading apparatus comprising:
a reading unit that reads a plurality of colors in a document;
a relative movement unit that causes the reading unit and the document to make a relative movement in a first scanning direction;
an output unit that outputs color information at an interval, the color information indicating whether the document read by the reading unit is chromatic, the interval being longer than a length in the first scanning direction of a color misregistration and longer than an interval of a length in a second scanning direction perpendicular to the first scanning direction, the color misregistration being expected to occur in an image if a speed of the relative movement fluctuates owing to a unique performance characteristic of the relative movement unit, the image being obtained as a result of reading by the reading unit.

11. The image reading apparatus according to claim 10, wherein the output unit outputs the color information at a plurality of the intervals in the image.

12. A non-transitory computer readable medium storing a program causing a computer to execute a process for reading an image in an image reading apparatus, the image reading apparatus including a reading unit and a relative movement unit, the reading unit reading a plurality of colors in a document, the relative movement unit causing the reading unit and the document to make a relative movement in a first scanning direction, the process comprising:
outputting color information at an interval, the color information indicating whether the document read by the reading unit is chromatic, the interval being longer in the first scanning direction than a length in the first scanning direction of a color misregistration, the color misregistration being expected to occur in an image if a speed of the relative movement fluctuates owing to a unique performance characteristic of the relative movement unit, the image being obtained as a result of reading by the reading unit.

13. A method for reading an image in an image reading apparatus, the image reading apparatus including a reading unit and a relative movement unit, the reading unit reading a plurality of colors in a document, the relative movement unit causing the reading unit and the document to make a relative movement in a first scanning direction, the method comprising:
outputting color information at an interval, the color information indicating whether the document read by the reading unit is chromatic, the interval being longer in the first scanning direction than a length in the first scanning direction of a color misregistration, the color misregistration being expected to occur in an image if a speed of the relative movement fluctuates owing to a unique performance characteristic of the relative movement unit, the image being obtained as a result of reading by the reading unit.

* * * * *